Jan. 30, 1934.                H. C. HARRIS                 1,945,369
                          PIVOTAL CONNECTION
                         Filed June 27, 1925              2 Sheets-Sheet 2
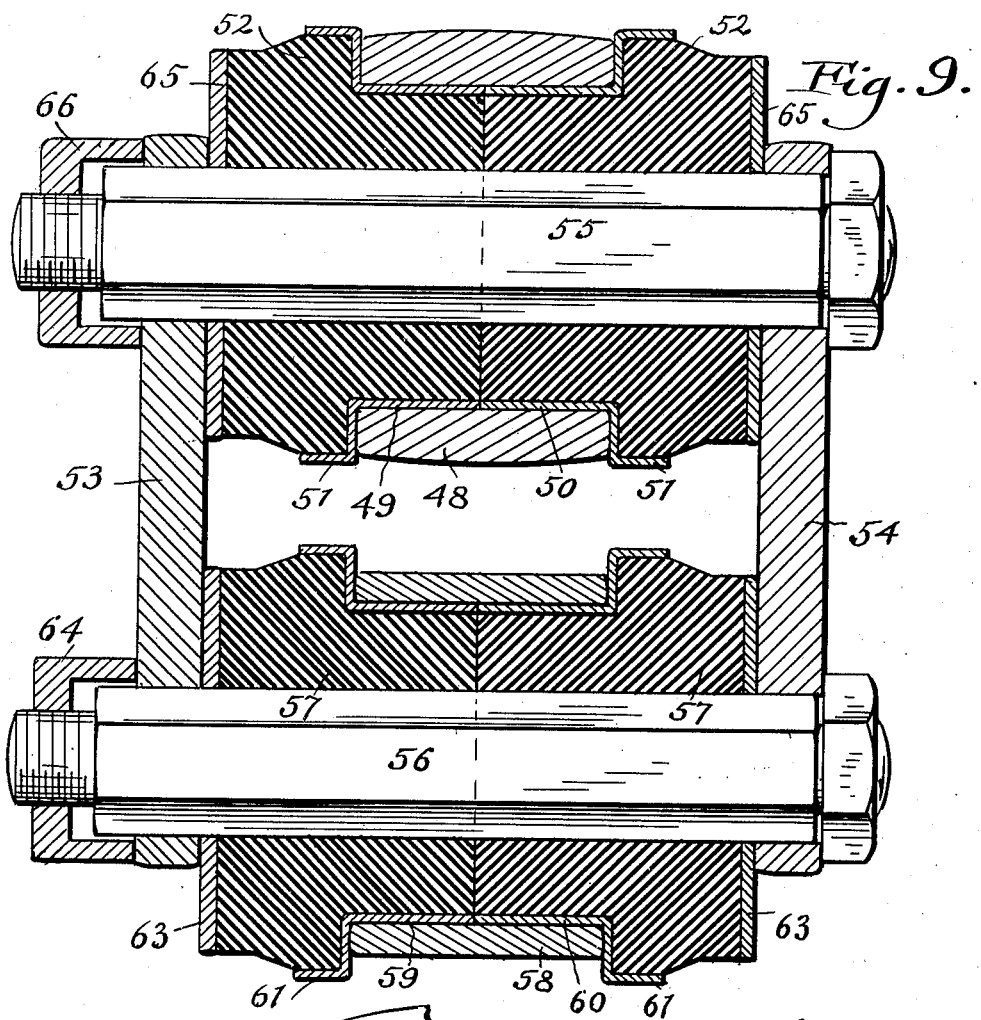
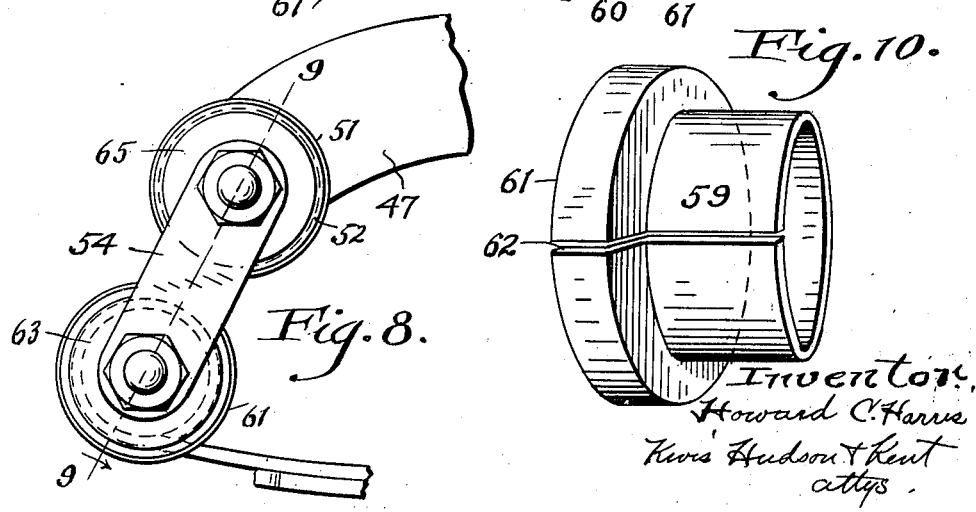
Inventor,
Howard C. Harris
Kwis Hudson & Kent
attys.

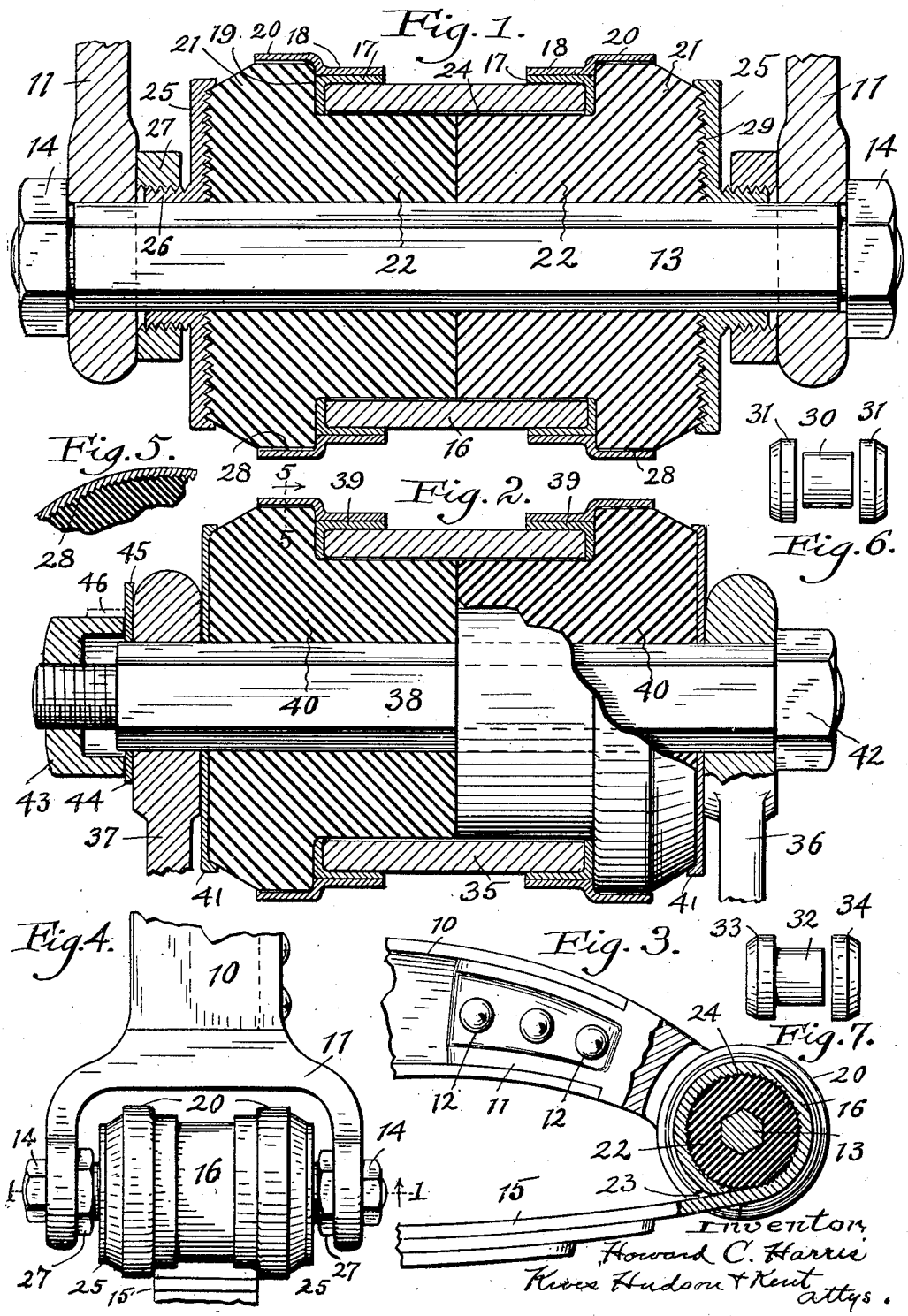

Patented Jan. 30, 1934

1,945,369

UNITED STATES PATENT OFFICE 1,945,369

PIVOTAL CONNECTION

Howard C. Harris, Akron, Ohio; Archer H. Harris, administrator of said Howard C. Harris, deceased, assignor, by mesne assignments, to The First-Central Trust Company, Akron, Ohio, a corporation of Ohio, as trustee Application June 27, 1925. Serial No. 39,970

46 Claims. (Cl. 267—54)

This invention relates broadly to connections between relatively oscillatable members and more particularly to connections between the springs and the frame of a motor vehicle.

It is one of the objects of the invention to provide an improved form of connection adapted for use generally in cases where the movement between the members is relatively small, so as to eliminate the usual journal bearings which, in the case of spring connections, are subject to excessive wear and otherwise objectionable on account of their tendency to squeak and rattle.

A further object of the invention is to provide a form of flexible connection between the springs and frame of the vehicle adapted to accommodate the necessary swiveling movements and permit slight relative movement of the parts, axially and thereby eliminate the objectionable noises that are incident to the ordinary forms of pivotal connections.

Other objects of the invention and the features of novelty will be apparent from the following description taken in connection with the accompanying drawings, of which:

Figure 1 is a longitudinal section through one form of spring connection embodying my invention, the section being taken on the line 1—1 of Figure 4;

Figure 2 is a view similar to Figure 1, but showing a connection between the spring and a shackle, the connection also embodying my invention;

Figure 3 is a side elevation of a connection between the front end of the vehicle frame and a spring, certain parts being shown in section;

Figure 4 is a plan view of the parts shown in Figure 3;

Figure 5 is a detail section on the line 5—5 of Figure 2;

Figure 6 is a side elevation of one form of my improved rubber bushings;

Figure 7 is a view similar to Figure 6, but showing still another form of bushing;

Figure 8 is a side elevation of a shackle connection between the spring and frame, with another form of my invention embodied therein;

Figure 9 is an enlarged section on the line 9—9 of Figure 8; and

Figure 10 is a perspective view of one of the parts shown in Figures 8 and 9.

Referring to Figures 1, 3 and 4, 10 indicates one of the usual side members of a motor vehicle frame having a yoke 11 which is secured thereto by rivets 12. A pintle 13, of any suitable cross-section but preferably of polygonal cross-section, and shown in the drawings as of hexagonal cross-section, is mounted in suitable openings in the yoke 11, so as to be held from turning relative thereto. The ends of the pintle 13 are turned down and threaded to receive the nuts 14 by means of which the pintle is held in position in the yoke. An ordinary leaf spring is indicated at 15 and provided with an eye 16 which I prefer to make of considerably larger diameter than is customary in a case of the ordinary type of shackle bolt connections. In this embodiment of the invention collars are arranged on the ends of the eye 16, being preferably formed of an inner ring 17 and an outer ring 18 which are fitted together as shown, and spot-welded or otherwise secured. The inner ring 17 has an inturned flange 19 which abuts against the end of the eye 16, and the outer ring 18 has an axially extending flange 20 which, with the flange 19 forms a cup-shaped recess which constitutes a counterbore or enlargement of the eye, to receive a radially extending flange 21 on a rubber bushing 22 to confine the same so as to limit radial expansion thereof. The axially extending flanges of the collars, just referred to, are cut away as indicated at 23 to provide clearance for the edges of the spring 15.

The interior surface of the eye 16 is preferably roughened, or serrated in an axial direction, as indicated at 24, to form an interlock with the bushing 22, so as to prevent the bushing from turning in the eye 16.

As illustrated in Figure 1, the bushing 22 is formed in two similar parts which may be inserted in the eye 16, from opposite sides, the inner ends of the bushings preferably meeting at the center of the eye, so as to fill the eye. The outer end portions of the heads or flanges 21 of the two bushing parts are of frusto-conical form and the end surfaces thereof are engaged by the plates or abutments 25 which are provided with central perforations to fit the pintle 13 so as to be non-rotatable thereon. Each of the plates 25 has an outwardly extending hub 26 that is externally threaded to receive a nut 27, the nuts engaging the inner surfaces of the arms of the yoke 11.

The inner surfaces of the flanges 20 are preferably roughened or serrated, as indicated at 28, to interlock with the peripheries of the flanges 21 of the bushings. The inner surfaces of the plates 25 are also roughened, as indicated at 29, to interlock with the ends of the bushings to prevent slipping both radially and circumferentially.

The parts are assembled as shown in Figure 1, and the nuts 27 are turned to force the plates 25 against the ends of the bushing 22 so as to compress the latter and expand the portions of the bushing that are within the eye 16 and the flanges 20, so as to normally prevent the bushing from slipping on the surfaces with which it is in engagement when the eye 16 is oscillated by the flexing movements of the spring 15. The flanges 21 of the bushing are also pressed against the flanges 19 of the collars 17 and this frictional engagement also assists in preventing the bushing from slipping relatively to the eye 16. The engagement of the flange 21 with the flanges 19 also serves to prevent axial movement of the rubber bushing relative to the eye.

On account of the pintle 13 being of hexagonal cross-section, the bushing 22 is normally prevented from turning thereon and the eye 16 is made relatively large as above described, in order to provide a sufficient amount of rubber between the pintle and the eye to accommodate by torsional flexing of the rubber the swiveling or oscillating movements of the eye relative to the pintle. The flanges 21, of the bushing, are made relatively thick, in an axial direction to provide sufficient rubber between the plates 25 and the flanges 19 and 20 to accommodate the relative movement between these parts by torsional flexing of the rubber.

Instead of making the bushing 22 in two parts, as shown in Figure 1, it may be made in three parts as shown in Figure 6, one of these parts 30 being of cylindrical form co-extensive with the eye 16, the other two parts being in the form of discs 31 constituting flanges similar to the flanges 21. The bushing may also be made in the form illustrated in Figure 7 in which the cylindrical part 32, which fits within the eye 16 is integral with one of the discs, as 33, the other part being a disc 34 that is similar to one of the discs 31.

The form of the invention illustrated in Figure 2 represents an application of my invention to the connection between a spring eye 35 and a shackle comprising the usual side plates 36 and 37. In this case the plates 36 and 37, of the shackle, carry a pintle 38, of polygonal cross-section which is non-rotatable in the openings provided therefor in the plates 37. The ends of the eye 35 are fitted with collars 39 which are similar to the collars shown in Figure 1. The rubber bushing is shown as comprising two similar sections 40, the same as illustrated in Figure 1, but the forms of bushing illustrated in Figures 6 and 7 may also be used. Plates 41 are arranged at the ends of the bushing and between the latter and the plates 36 and 37 and have peripheral flanges forming recesses on their inner sides to receive and confine the outer ends of the bushings against radial expansion. One end of the pintle 38 is provided with a head 42 and the other end is provided with a recessed adjusting nut 43 by means of which the plates 36, 37 and 41 may be drawn toward each other to compress the bushing 40 and cause it to firmly grip the pintle 38 and interior of the eye 35 as well as the collars 39. A lock washer 44 is arranged under the nut 43 and may be provided with a tongue 45 adapted to be bent over against one of the faces on the nut, as indicated at 46, to prevent the nut from loosening.

In the form of the invention illustrated in Figure 2, the movements between the plates 36 and 37 and the eye 35 are accommodated by the torsional flexing of the rubber bushing substantially without slippage of the latter in the eye 35 or on the pintle 38. The metal parts associated with the shackle are entirely separated from the metal parts associated with the spring, by the rubber bushing, and on account of the parts being clamped together by the nut 43, all liability of squeaks and rattles is eliminated.

In Figures 8 to 10 I have illustrated an application of the invention to a shackle connection between a rear spring and the rear end of the vehicle frame. The end of the frame is indicated at 47 and is provided with an eye 48 in which there is arranged a split bushing comprising the parts 49 and 50, each of which has a cup-shaped flange 51 to receive the flange 52 of the rubber bushing. The shackle plates are indicated at 53 and 54 and, at one end, are mounted on the hexagonal pintle 55 which is mounted in the rubber bushing. The lower ends of the shackle plates 53 and 54 carry the hexagonal pintle 56 on which is mounted the rubber bushing comprising the sections 57. The spring eye is indicated 58 and has arranged therein a split bushing comprising the parts 59 and 60 which are similar to the parts 49 and 50, and have the cup-shaped flanges 61. One of these bushing parts is illustrated in Figure 10, the split therein being indicated at 62. Plates or washers 63 are non-rotatably mounted on the pintle 56 between the ends of the bushing 57 and the plates 53 and 54, and a recessed nut 64, which is threaded on one end of the pintle 56, clamps the parts together in the manner described with reference to the construction illustrated in Figure 2. Plates or washers 65 are also arranged on the pintle 55 and the parts are clamped together by a nut 66, on the latter.

By employing a split bushing comprising two parts such as illustrated in Figure 10, I provide a relatively inexpensive construction that has the further advantage of permitting the rubber bushing to be compressed radially for insertion in the eye 48 or the eye 58 and to permit the bushing to be rotated so that when the parts are assembled, the rubber bushing will not be distorted when the spring is in its normal position. The nuts 64 and 66 may then be tightened to draw the parts together and compress the rubber bushings and expand the split bushings so as to cause the latter to firmly grip the eyes in which they are mounted. The split bushings and the plates 63 and 65 may be roughened, as previously described, in order to form a better interlock with the rubber bushings.

The compression of the rubber bushings in the various forms of the invention has the advantage of reducing the resiliency of the rubber and thus making it capable of preventing any material endwise rocking or radial shifting of the pintle which might otherwise develop when a vehicle is travelling over rough roads. Endwise rocking and radial shifting of the pintle has proved to be a disadvantage in prior spring connections embodying rubber parts. While the compression of the bushings is sufficient to normally prevent torsional slippage in the eye or on the pintle, I have found that abnormal relative movements between the pintle and eye are accommodated by some slippage and this has the advantage of avoiding a tearing or shearing of the rubber.

While I have illustrated and described what I now consider to be preferred forms of my invention, as applied to vehicle springs, it will be understood that the proportions of the parts and arrangement thereof are subject to change without departing from the spirit of my invention as set forth in the appended claims. It will also be understood that the embodiments of my invention herein disclosed are merely illustrative of the principles of the invention and that the invention is applicable generally, to pivotal connections in which the relative movements of the connected parts are within the range of the possible torsional flexing of the rubber bushings.

Having described my invention, I claim:

1. In apparatus of the class described, the combination of two members between which there is relative oscillating movement, one of said members having an eye and the other carrying a pintle extending through said eye, a flexible rubber bushing arranged between said pintle and said eye, and means for compressing said bushing in an axial direction for the purpose of expanding it to prevent relative slipping movement between the bushing and said eye, said bushing being also held against relative slipping movement on said pintle whereby the relative oscillating movements of the pintle and eye are accommodated by the flexing of the bushing.

2. In apparatus of the class described, the combination of two members between which there is relative oscillating movement, one of said members having an eye and the other carrying a pintle extending through said eye, a flexible rubber bushing arranged between said pintle and said eye and projecting beyond the ends of the eye, and means engaging the ends of said bushing for compressing it in an axial direction so as to expand the bushing within said eye to prevent relative slipping movement between the bushing and said eye, the parts being so constructed and arranged that relative slipping between said pintle and said bushing is prevented and turning and axial movements between said members are provided for by the flexing of said bushing.

3. In apparatus of the class described, the combination of two members between which there is relative oscillating movement, one of said members having an eye and the other carrying a pintle extending through said eye, a flexible rubber bushing arranged between said pintle and said eye and held against turning relative thereto, said bushing having enlarged flanges at the ends of said eye, means associated with said pintle and engaging the ends of said bushing to compress the latter in an axial direction, and the parts being so constructed and arranged that relative turning and axial movements between said members are provided for by the flexing of said bushing.

4. In apparatus of the class described, the combination of a frame member, a spring and a flexible connection therebetween comprising a pintle carried by the frame, an eye on the spring, a rubber bushing between said pintle and said eye and held against turning on said pintle and within said eye, and adjusting means carried by said pintle eye for compressing said bushing in an axial direction.

5. In apparatus of the class described, the combination of two relatively oscillatable members one of which has an eye and the other a pintle with radially extending abutments spaced from the ends of said eye, and a rubber bushing surrounding said pintle and having flanges between said abutments and the ends of said eye and held against turning in said eye and relative to said pintle and said abutments.

6. In apparatus of the class described, the combination of two relatively oscillatable members one of which has an eye and the other a pintle of polygonal cross-section with radially extending abutments thereon spaced from the ends of said eye, and a rubber bushing non-rotatably mounted on said pintle and within said eye and having enlarged flanges between the ends of said eye and said abutments.

7. In spring connections the combination of an eye, a pintle extending through said eye and relative to which the eye has oscillatory movement, a rubber bushing arranged between said eye and said pintle and non-rotatable with respect thereto, said bushing projecting from the ends of the eye, and means movable axially on said pintle for compressing said bushing axially and thereby expand it within said eye.

8. In spring connections the combination of an eye, a pintle extending through said eye and relative to which the eye has oscillatory movement, a longitudinally split metal bushing within said eye, a rubber bushing arranged between said split bushing and said pintle and non-rotatable with respect to the same, said rubber bushing projecting from the ends of said eye, and members movable longitudinally on said pintle for compressing said rubber bushing to expand the latter in said eye.

9. In spring connections, the combination of a frame eye, a spring eye, pintles extending through said eyes, shackle members connecting said pintles, rubber bushings between said pintles and said eyes and non-rotatable with respect to the same, said bushings projecting from the ends of the eyes, and means for compressing said bushings axially.

10. In spring connections, the combination of a frame eye, a spring eye, pintles extending through said eyes, shackle members connecting said pintles, rubber bushings between said pintles and said eyes and non-rotatable with respect to the same, said bushings having enlarged flanges at the ends of said eyes, and means for compressing said bushings axially.

11. In spring connections, the combination of a frame eye, a spring eye, collars carried by said eyes and having enlarged cup-shaped flanges at the ends of the eyes, pintles extending through said eyes, shackle members connecting said pintles, rubber bushings between said pintles and said eyes and having enlarged flanges fitting said cup-shaped flanges, and means for compressing said bushings axially.

12. In spring connections, the combination of a frame eye, a spring eye, pintles of non-circular cross-section extending through said eyes, shackle members connecting said pintles and in which the latter are non-rotatably held, rubber bushings between said pintles and said eyes and non-rotatable on said pintles and within said eyes, said bushings projecting from the ends of the eyes, and means for compressing said bushings axially.

13. In spring connections, the combination of a frame eye, a spring eye, longitudinally split metal bushings fitted in said eyes and having enlarged cup-shaped flanges at the ends of the eyes, pintles of non-circular cross-section extending through said eyes, shackle members connecting said pintles, rubber bushings within said split bushings and fitting said pintles so as to be non-rotatable thereon, said rubber bushings having enlarged end portions fitting cup-shaped flanges, and means on said pintles for compressing said rubber bushings axially.

14. In spring connections, the combination of a frame eye and a spring eye each having enlargements at the ends thereof, pintles extending through said eyes, shackle members connecting said pintles and relative to which the pintles are non-rotatable, rubber bushings between said pintles and said eyes and having flanges fitting said enlargements, and means for compressing said bushings axially so as to normally hold them against torsional slippage on the pintles and within the eyes.

15. In spring connections, the combination of a frame eye and a spring eye each having enlargements at the ends thereof, pintles extending through said eyes, shackle members connecting said pintles and relative to which the pintles are non-rotatable, rubber bushings between said pintles and said eyes and having flanges fitting said enlargements and projecting axially therefrom, means, including parts engaging the ends of said flanges, for compressing said bushings axially so as to normally hold them against torsional slippage on the pintles and within the eyes, and the said projecting portions of said flanges being adapted to accommodate the relative movements between the said parts and the ends of said eyes by a relative twisting of different portions of the flanges.

16. In spring connections, the combination of two members between which there is relative oscillating movement, one of said members having an eye with enlargements at the ends thereof and the other a pintle extending through said eye, a rubber bushing between said pintle and said eye and having flanges fitting said enlargements, and means for compressing said bushing axially so as to normally hold it against torsional slippage on the pintle and within the eye.

17. In spring connections, the combination of two members between which there is relative oscillating movement, one of said members having an eye with enlargements at the ends thereof and the other a pintle extending through said eye, a rubber bushing between said pintle and said eye and having flanges fitting said enlargements and projecting axially therefrom, means, including parts engaging the ends of said flanges and non-rotatable with respect to said pintle, for compressing said bushing axially so as to normally hold it against torsional slippage on the pintle and within the eye, and the said projecting portions of said flanges being adapted to accommodate the relative movements between the said parts and the ends of said eye by a relative twisting of different portions of the flanges.

18. A connection of the type described comprising a member having a bearing, a bolt extending through said bearing, a bushing interposed between said bolt and said bearing consisting of an elastic tubular member expanded into tight engagement with the surface of the bolt and the inner face of the bearing, and means coacting with said bolt to so expand said tubular member.

19. A connection of the type described comprising a member having a bearing, a connecting member, a bolt extending through said bearing and supporting said connecting member, and a bushing interposed between said bolt and said bearing, consisting of an elastic tubular member expanded into tight engagement with the surface of the bolt and the inner face of the bearing.

20. A connection of the type described comprising a member having a bearing, a connecting member, a bolt extending through said bearing and supporting said connecting member, and a bushing interposed between said bolt, the bearing, and said connecting member, said bushing consisting of an elastic tubular member compressed between said connecting member, the bolt and the inner and end surfaces of the bearing.

21. A connection of the type described, comprising a member having a bearing, connecting members at the ends thereof, a bolt extending through said bearing and supporting said connecting members, a bushing having an elastic tubular portion interposed between said bolt and the inner face of the bearing, and means coacting with the bolt to compress said tubular portion endwise to expand the same radially into tight engagement with the inner face of the bearing and the surface of the bolt.

22. A connection of the type described comprising a member having a bearing, a bolt extending through said bearing, and a bushing interposed between the bolt and the bearing, consisting of two elastic tubular members extending into the opposite end portions of said bearing and abutting against each other, and means coacting with the bolt to compress said tubular members endwise and thereby expand them radially into tight engagement with the inner face of the bearing and the surface of the bolt.

23. A connection of the type described comprising a member having a bearing, a bolt extending through said bearing, connecting members supported on the end portions of the bolt, and a bushing interposed between the bolt, the bearing and said connecting members, consisting of two elastic tubular members extending into the opposite end portions of said bearing and abutting against each other, and means coacting with the bolt and with said connecting members to compress the outer end portions of said tubular members against the end faces of the bearing and meanwhile hold such end portions against outward expansion, thereby compressing said tubular members endwise to expand their inner portions radially into tight engagement with the inner face of the bearing and the surface of the bolt.

24. A connection of the type described comprising a member having a bearing, a bushing composed of an elastic tubular member fitted in said bearing and having a head at its outer end adapted to abut against the adjacent end of the bearing, a bolt extending through the bushing, and a recessed member mounted on an end portion of the bolt and extending over the outer face and the peripheral portion of said head to confine the same and resist outward expansion thereof when said recessed member is drawn toward the bearing by said bolt.

25. A connection of the type described comprising a member having a bearing, a two-part bushing composed of elastic tubular members fitted in the opposite end portions of said bearing and each having a head at its outer end adapted to abut against the adjacent end of the bearing, a bolt extending through the bushing, and recessed members on the end portions of the bolt and extending over the outer faces and peripheral portions of said heads to confine said heads and resist outward expansion thereof when said recessed members are drawn together by said bolt.

26. A connection of the type described comprising a member having a bearing, a two-part bushing composed of elastic tubular members fitted in the opposite end portions of said bearing, the inner ends of said tubular members being adapted to abut against each other, said members having heads at their outer ends adapted to abut against the adjacent ends of the bearing, a bolt extending through the bushing, and recessed members mounted on the end portions of the bolt and extending over the outer faces and peripheral portions of said heads for confining the same and resisting outward expansion thereof when said recessed members are drawn together by said bolt.

27. In a bushing between two connecting members, a hollow bearing member, a shaft extending therethrough, a yielding non-metallic element carried between the two, means on the opposed surfaces of the bearing member and shaft to prevent the element from turning thereon, and means to compress the yielding element to vary the positive nature of the connection.

28. In a bushing between two connecting members, a hollow bearing member, a shaft extending therethrough, a yielding non-metallic element carried between the two, serrations on the inner surface of the bearing member, an irregular surface on the shaft, and means to compress the yielding element to vary the positive nature of the connection.

29. A connection of the type described comprising a member having a bearing, a bolt extending through said bearing, an elastic tubular bushing interposed between said bolt and said bearing, said bushing having a substantially frusto-conical head at its outer end, and means including a recessed member in which said head is seated, co-acting with said bolt to apply inward pressure to said head, to compress the bushing tightly between the bolt and the bearing.

30. A connection of the type described comprising a member having a bearing, a bolt extending through said bearing, an elastic tubular bushing interposed between said bolt and said bearing, said bushing having a substantially frusto-conical head at its outer end, a recessed member supported on said bolt and in which said head is seated, and means co-acting with said bolt to draw said recessed member toward the adjacent end of the bearing and thereby compress said head.

31. A connection of the type described comprising a member having a bearing, a two part bushing composed of elastic tubular members fitted in the opposite end portions of said bearing with their inner ends abutting against each other, said bushing members having substantially frusto-conical heads at their outer ends, a bolt extending through the bushing, connecting members supported by the end portions of the bolt, plates non-rotatably connected with said connecting members, and having recesses in their inner faces adapted to receive said heads, and means co-acting with said bolt to draw said connecting members toward each other.

32. A connection of the type described, comprising a member having a bearing, a bushing composed of an elastic tubular member fitted in said bearing and having a substantially frusto-conical head at one end adapted to abut at its base against the adjacent end of the bearing, a bolt extending through the bushing, and a member non-rotatably mounted on an end portion of the bolt and having a recess adapted to receive and confine a portion of the head to resist outward expansion thereof when said recessed member is drawn toward the bearing by said bolt.

33. A connection of the type described comprising a member having a bearing, a two-part bushing composed of elastic tubular members fitted in the opposite end portions of said bearing and each having a substantially frusto-conical head at its outer end adapted to abut at its base against the adjacent end of the bearing, a bolt extending through the bushing, and members non-rotatably mounted on the end portions of the bolt and having recesses adapted to receive and engage portions of said heads to confine said heads and resist outward expansion thereof when said recessed members are drawn together by said bolt.

34. A connection of the type described comprising a member having a bearing, a two-part bushing composed of elastic tubular members fitted in the opposite end portions of said bearing and abutting against each other, each of said members having a substantially frusto-conical head at its outer end adapted to abut at its base against the adjacent end of the bearing, a bolt extending through the bushing and having a head and a nut and members having recesses adapted to receive and confine portions of the heads of the bushing members and resist outward expansion thereof, said members being arranged to be drawn together by screwing the nut on the bolt.

35. A torsionally flexible bushing for vehicle springs composed of elastic material and comprising a tubular body portion having a substantially frusto-conical head at one end thereof.

36. A pivotal joint including in combination, a hanger bracket having a pair of dependent spaced fingers, a pivot pin of non-circular cross-section carried by said fingers in fixed relation therewith, a member to be pivotally connected with said pin, a body of deformable elastic material interposed between said member and pin and having interlocking engagement with said pin and surrounded by said member, and other bodies of elastic material carried by said pin and engageable with the opposite sides of said member to resist relative axial movement between said member and said pin.

37. A pivotal joint including in combination with two members to be pivotally interconnected, enclosing means associated with one of the members, a pivot pin of non-circular cross-section associated with the other of said members and extending through said enclosing means in spaced relation with the walls thereof, a body of elastic deformable material within said enclosing means and filling the space between said pin and enclosing means and adapted for torsional deformation upon relative movement of said parts, retainer members at the sides of said enclosing means, and elastic material between said retainers and said enclosing means to resist relative axial movement therebetween.

38. A pivotal joint including in combination a hanger bracket having a pair of dependent spaced fingers, a pivot pin carried by said fingers in fixed relation therewith, a member to be pivotally connected with said pin, a body of deformable elastic material interposed between said member and pin and secured thereto so that the relative oscillatory movements between said member and said pin are accommodated by the torsional flexing of said material, and other bodies of elastic material held against axial movement relative to said pin and engaging with the opposite sides of said member to resist axial movement of said member relative to said pin.

39. A pivotal joint including in combination a hanger bracket having a pair of dependent spaced fingers, a pivot pin carried by said fingers in fixed relation therewith, a member to be pivotally connected with said pin, a body of deformable elastic material interposed between said member and pin and secured thereto so that the relative oscillatory movements between said member and said pin are accommodated by the torsional flexing of said material, plates exteriorly of said member and between said fingers, and other bodies of elastic material arranged between said plates and the ends of said member to resist axial movement of said member relative to said pin.

40. A pivotal joint including in combination a pivot pin, an eye member through which said pin extends, a body of deformable elastic material interposed between said pin and said eye member and so secured thereto that the relative oscillations between the pin and eye member are accommodated by torsional flexing of said material, abutments spaced from the ends of said eye member and held against movement axially of said pin, and annular bodies of deformable material between said abutments and the ends of said eye member to resist axial movements of said member relative to said pin.

41. A pivotal joint including in combination a pivot pin, an eye member through which said pin extends, a body of deformable elastic material interposed between said pin and said eye member and so secured thereto that the relative oscillations between the pin and eye member are accommodated by torsional flexing of said material, abutments spaced from the ends of said eye member and held against movement axially of said pin, annular bodies of deformable material between said abutments and the ends of said eye member to resist axial movements of said member relative to said pin, and means for adjusting said abutments axially of said pin.

42. In a spring shackle, the combination of a frame member, a spring eye, rubber bushings in said member and said eye, pintles extending through said bushings, a link through which the load is transmitted from one of said pintles to the other, and means on said pintles for compressing said bushings axially and thereby cause them to so engage said frame member, said eye and said pintles that the relative oscillations of the parts will be accommodated by torsional flexing of said bushings.

43. In a spring shackle, the combination of a frame member, a spring eye, rubber bushings in said member and said eye, pintles extending through said bushings, a link through which the load is transmitted from one of said pintles to the other, and means including plates engaging the outer ends of said bushings and nuts on said pintles for compressing said bushings axially and thereby cause them to so engage said frame member, said eye and said pintles that the relative oscillations of the parts will be accommodated by torsional flexing of said bushings.

44. In spring shackles for motor vehicles, the combination of a frame member provided with an eye having two radially extending annular abutment surfaces therein, a spring having an eye provided with two radially extending annular abutment surfaces therein, pairs of flexible bushings arranged in said eyes with their ends projecting therefrom and having surfaces engaging said abutment surfaces, a pair of shackle members including recessed parts to receive the outer ends of said bushings, and bolts extending through said shackle members and bushings whereby the shackle members may be drawn toward said eyes to compress said bushings axially and thereby cause the bushings to so engage said parts, bolts and eyes to accommodate the relative oscillations of said shackle members and eyes by flexing torsionally.

45. In spring shackles for motor vehicles, the combination of a frame member provided with an eye having two radially extending annular abutment surfaces therein, a spring having an eye provided with two radially extending annular abutment surfaces therein, pairs of flexible bushings arranged in said eyes with their outer ends projecting therefrom and having surfaces engaging said abutment surfaces, a pair of shackle members including recessed parts to seat the outer ends of said bushings, and bolts non-rotatably secured in at least one of said shackle members and extending axially through said bushings and whereby the shackle members may be drawn toward said eyes to compress said bushings axially and thereby cause the bushings to so engage said parts, bolts and eyes as to accommodate the relative oscillations of said shackle members and eyes by flexing torsionally.

46. In spring shackles for motor vehicles, the combination of a frame member provided with an eye having two radially extending annular abutment surfaces therein, a spring having an eye provided with two radially extending annular abutment surfaces therein, pairs of flexible bushings arranged in said eyes with their outer ends projecting therefrom and having surfaces engaging said abutment surfaces, a pair of shackle members including recessed parts to seat the outer ends of said bushings, and bolts having non-circular portions extending through said shackle members and said bushings whereby the shackle members may be drawn toward said eyes to compress said bushings axially and thereby cause the bushings to so engage said parts, bolts and eyes as to accommodate the relative oscillations of said shackle members and eyes by flexing torsionally.

HOWARD C. HARRIS.